(12) United States Patent
Wang et al.

(10) Patent No.: US 8,199,272 B2
(45) Date of Patent: Jun. 12, 2012

(54) FLEXIBLE DISPLAY DEVICE

(75) Inventors: Yi-Ching Wang, Hsinchu (TW);
Po-Wen Hsiao, Hsinchu (TW);
Ted-Hong Shinn, Hsinchu (TW)

(73) Assignee: E Ink Holdings Inc., Hsinchu County (TW)

( * ) Notice: Subject to any disclaimer, the term of this patent is extended or adjusted under 35 U.S.C. 154(b) by 198 days.

(21) Appl. No.: 12/422,162

(22) Filed: Apr. 10, 2009

(65) Prior Publication Data

US 2010/0225875 A1   Sep. 9, 2010

(30) Foreign Application Priority Data

Mar. 4, 2009   (TW) ................................ 98107040 A

(51) Int. Cl.
*G02F 1/136* (2006.01)
(52) U.S. Cl. .......................................... 349/53; 349/190
(58) Field of Classification Search ................. 349/160, 349/53, 153, 190
See application file for complete search history.

(56) References Cited

U.S. PATENT DOCUMENTS

| | | | | |
|---|---|---|---|---|
| 6,057,898 A | * | 5/2000 | Itoh et al. | 349/73 |
| 7,088,418 B1 | * | 8/2006 | Yamashita et al. | 349/153 |
| 7,703,184 B2 | * | 4/2010 | Meager | 24/399 |
| 7,817,236 B2 | * | 10/2010 | Jang et al. | 349/153 |
| 2006/0139556 A1 | * | 6/2006 | Ahn et al. | 349/153 |
| 2007/0024796 A1 | * | 2/2007 | Suzuki | 349/153 |
| 2007/0146598 A1 | * | 6/2007 | Yokokawa et al. | 349/123 |
| 2008/0044113 A1 | * | 2/2008 | Tilman et al. | 383/103 |
| 2008/0137022 A1 | * | 6/2008 | Komeno et al. | 349/153 |
| 2008/0252838 A1 | * | 10/2008 | Chan et al. | 349/153 |
| 2008/0278671 A1 | * | 11/2008 | Suzuki | 349/153 |
| 2009/0089983 A1 | * | 4/2009 | Meager | 24/387 |
| 2009/0290117 A1 | * | 11/2009 | Watanabe et al. | 349/153 |
| 2009/0324141 A1 | * | 12/2009 | Dais et al. | 383/59 |
| 2010/0083825 A1 | * | 4/2010 | Andersen et al. | 92/169.1 |

FOREIGN PATENT DOCUMENTS

CN           101051126 A         10/2007

\* cited by examiner

*Primary Examiner* — Edward Glick
*Assistant Examiner* — Sang Nguyen
(74) *Attorney, Agent, or Firm* — Chun-Ming Shih

(57) ABSTRACT

A flexible display device includes an array substrate, a display medium layer, a transparent substrate and a first sealant. The array substrate has a display region and a sealant spread region surrounding the display region. The display medium layer is disposed on the array substrate and located in the display region. The transparent substrate is disposed above the display medium layer. The first sealant is formed between the array substrate and the transparent substrate and located in the sealant spread region of the array substrate. The first sealant has a first sidewall and a second sidewall. One of the first sidewall and the second sidewall has a plurality of fillisters arranged at intervals. Since the first sealant of the flexible display device has the fillisters arranged at intervals, the stress imposed on the first sealant may be decreased. Therefore, the life of the first sealant may be prolonged and the sealing performance of the flexible display device can be improved.

16 Claims, 6 Drawing Sheets

__FLEXIBLE DISPLAY DEVICE__

This application claims priority to a Taiwan application No. 098107040 filed Mar. 4, 2009.

BACKGROUND

1. Field of the Invention

The invention relates to a display device, and more particular to a flexible display device.

2. Description of the Related Art

With progress of science and technology, display devices are used in any electric products popularly. Moreover, since the development trend of the portable electrical product is to achieve light weight and thin thickness, the flexible display device are researched.

FIG. 1 is a schematic cross-sectional view of the conventional flexible display device. Referring to FIG. 1, the display device 10 comprises a flexible array substrate 11, a display medium layer 12, a transparent substrate 13, a sealant 14 and a driver IC 15. The flexible array substrate 11 comprises a substrate 112 and a switch elements array 114 disposed thereon. The display medium layer 12 and the driver IC 15 are disposed on the flexible array substrate 11. The driver IC 15 is electrically connected to the switch elements array 114. The transparent layer 13 is disposed on the display medium layer 12. The sealant 14 is formed on the flexible array substrate 11 and surrounding the display medium layer 12 and the transparent layer 13 for preventing the display device 10 from being damaged by the permeated air or mist from outside.

However, the sealant 14 may be slit as the display device 10 is bent several times. Thus, the air or mist from outside may permeate into the display device 10 and damage it. Therefore, it is one of the important issues for the people skilled in this art that how to prevent the sealant 14 from slitting and enhance for increasing the packaging reliability of the display device.

BRIEF SUMMARY

The invention is directed to a flexible display device comprising a sealant with a particular shape for improving the packaging reliability of the flexible display device.

The invention provides a flexible display device comprising an array substrate, a display medium layer, a transparent substrate and a first sealant. The array substrate has a display region and a sealant spread region surrounding the display region. The display medium layer is disposed on the array substrate and located in the display region. The transparent substrate is disposed above the display medium layer. The first sealant is disposed between the array substrate and the transparent substrate and located in the sealant spread region to surround the display region. The first sealant has a first sidewall and a second sidewall. Moreover, at least one of the first sidewall and the second sidewall has a plurality of fillisters arranged at intervals.

Since the fillisters are arranged at intervals on sidewalls of the sealant of the flexible display device of the invention has, the stresses imposed on the sealant as the flexible display device is under bending may be decreased. Then, the sealant may avoid breaking resulting from being bent for long time or several times. Therefore, the packaging reliability of the flexible display device may be enhanced.

In order to make the aforementioned and other objects, features and advantages of the invention comprehensible, preferred embodiments accompanied with figures are described in detail below.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
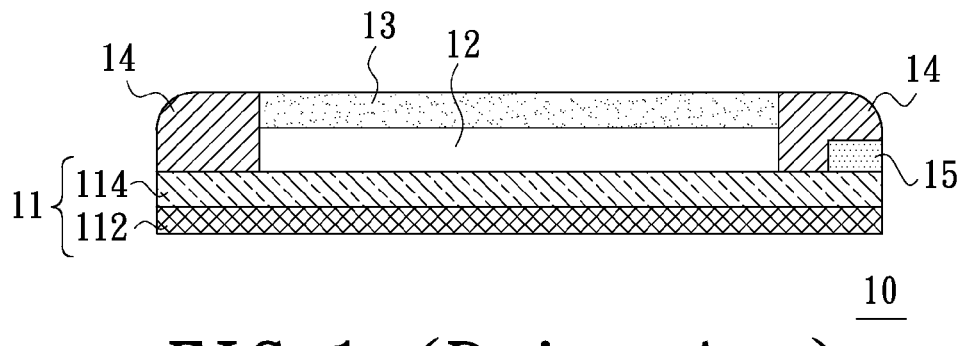
FIG. 1 is a schematic cross-sectional view of the conventional flexible display device.
Figure 2A:
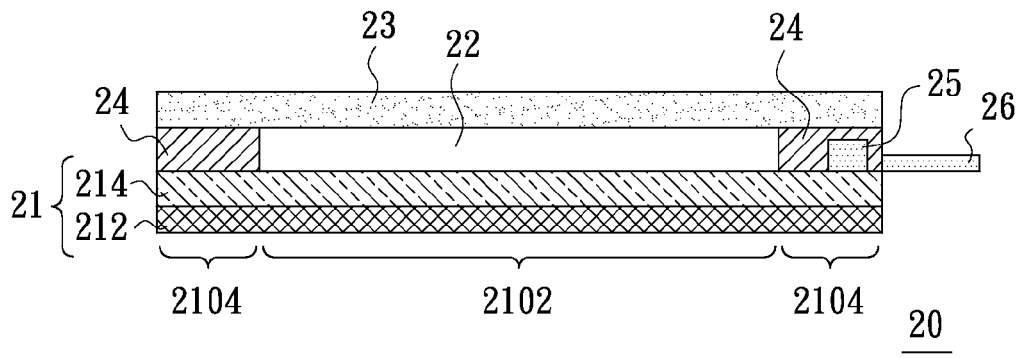
FIG. 2A is a schematic cross-sectional view of the flexible display device according to an embodiment of the invention
Figure 2B:
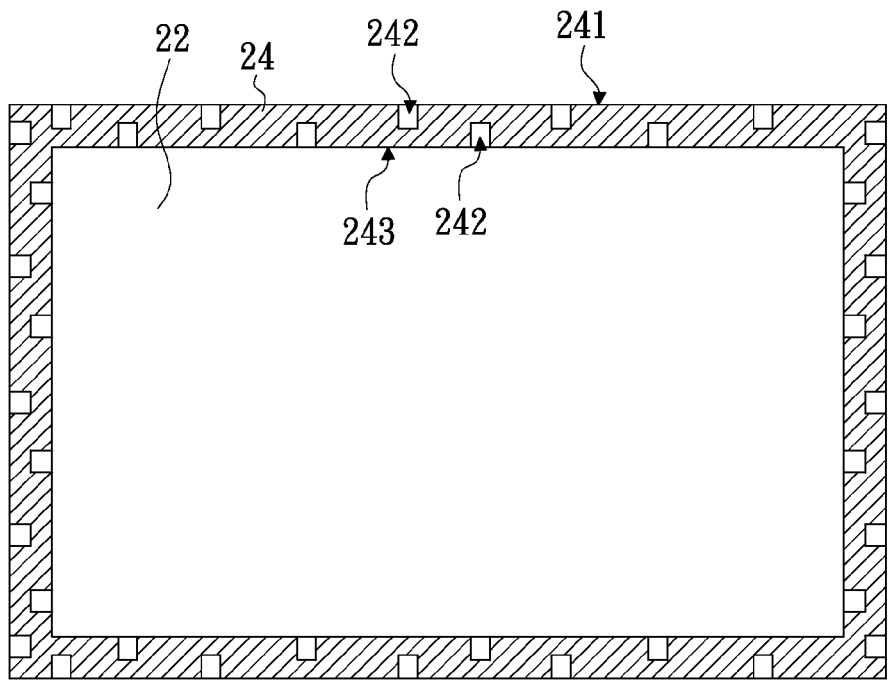
FIG. 2B is a schematic perspective view of the flexible display device according to an embodiment of the invention.

FIG. 2A is a schematic cross-sectional view of the flexible display device according to an embodiment of the invention, and FIG. 2B is a schematic perspective view of the flexible display device according to an embodiment of the invention. Referring to FIGS. 2A and 2B, the flexible display device 20 comprises an array substrate 21, a display medium layer 22, a transparent substrate 23 and a first sealant 24. The array substrate 21 has a display region 2102 and a sealant spread region 2104 surrounding the display region 2102. In detail, the array substrate 21 comprises a substrate 212 and a switch elements array 214 disposed thereon. The substrate 212 may be a flexible substrate made of plastic, such as polyethylene terephthalate (PET), polyethylene naphthalene (PEN), aromatic polyamide, polyimide (PI), polycycloolefin, polysulfone (PSU), epoxy resin, polycarbonate (PC) or polymethyl methacrylate (PMMA). Additionally, the switch elements array 214 may be an active elements array or a passive elements array. In this embodiment, the switch elements array 214 is, for example, a thin Film transistors array (TFTs array).

The display medium layer 22 is disposed on the array substrate 21 and located in the display region 2102. The transparent substrate 23 is disposed above the display medium layer 22. Specifically, the display medium layer 22 may be electro-phoretic layer, electro-wetting Layer, liquid crystal layer or organic electro-luminescence layer. Further, the transparent substrate 23 may be made of plastic the same with or similar to the substrate 212. That is, the materials of the transparent substrate 23 also may be polyethylene terephthalate (PET), polyethylene naphthalene (PEN), aromatic polyamide, polyimide (PI), polycycloolefin, polysulfone (PSU), epoxy resin, polycarbonate (PC) or polymethyl methacrylate (PMMA). Additionally, the transparent substrate 23 may also be a color filter substrate.

The first sealant 24 formed between the array substrate 21 and the transparent substrate 23 and located in the sealant spread region 2104 has a first sidewall 241 and a second sidewall 243. Moreover, at least one of the first sidewall 241 and the second sidewall 243 has a plurality of fillisters 242. Specifically, the first sealant may be made of ultraviolet photo-curing adhesive or heat-curing adhesive, such as at least one of silicone, polyurethane, acrylic resin and epoxy resin.

Since the first sidewall 241 and the second sidewall 243 are not passed through by the fillister 242 arranged at intervals, the external air or mist is difficult to penetrate the first sealant 24 from the fillisters 242. Thus, the damages of the internal elements of the flexible display device 20 resulting from the external air or mist may be prevented. That is, the first sealant 24 not only can prevent the external air or mist from penetrating into the flexible display device 20, also can reduce the stress imposed on the first sealant 24 as the flexible display device 20 is bent by the fillisters 242 on the first sidewall 241 and the second sidewall 243. Thus, the first sealant 24 can avoid breaking resulting from fatigue of material strength after the flexible display device 20 went through being bent at several times.

Figure 3:
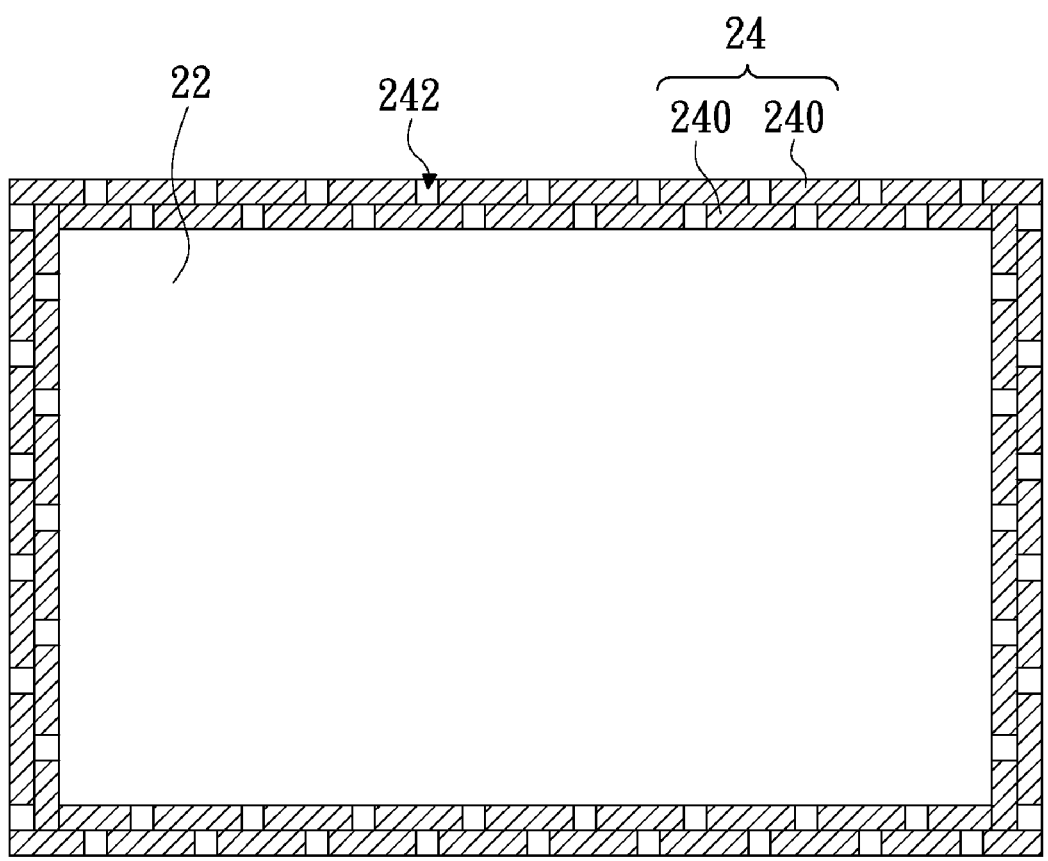
FIG. 3 is a schematic perspective view of the flexible display device according to another embodiment of the invention.

Especially, in other embodiments of the invention, the sealant 24 may comprise a plurality of sealant units 240 interlaced and stacked fromward the display region 2012, as shown in FIG. 3. In this embodiment, the sealant units 240 are interlaced and to each other and stacked to two layer fromward the display region 2012 in the sealant spread region 2104 of the array substrate 21, and each fillister 242 of this embodiment is the interval between two adjacent sealant units.

Figure 4:
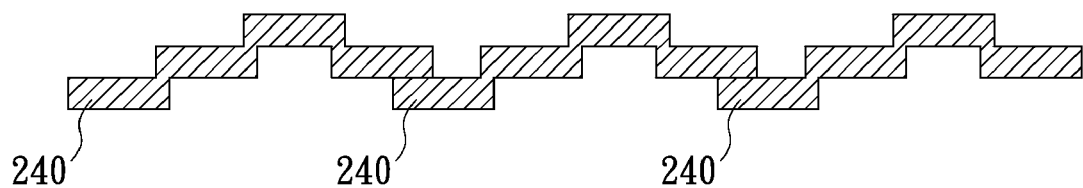
FIG. 4 is a schematic diagram illustrating a portion of the sealant of the flexible display device according to another embodiment of the invention.
Figure 5:
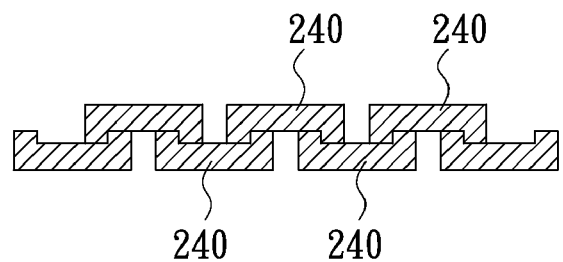
FIG. 5 is a schematic diagram illustrating a portion of the sealant of the flexible display device according to another embodiment of the invention.
Figure 6:
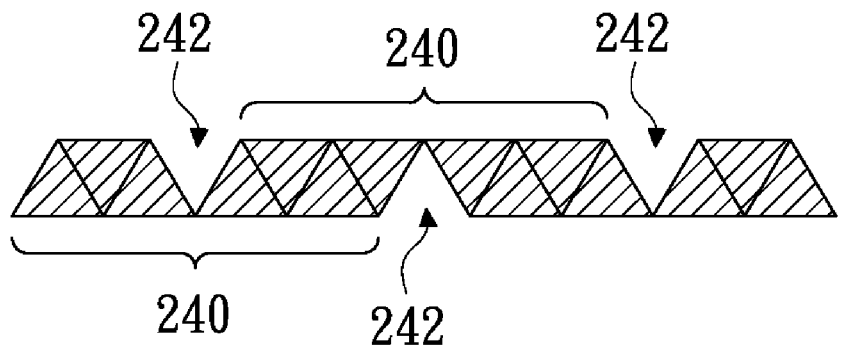
FIG. 6 is a schematic diagram illustrating a portion of the sealant of the flexible display device according to another embodiment of the invention.

It is worth to mention that the sealant units 240 also may be arranged at other types, and the shape thereof is not limited to the quadrangle shown in FIG. 3. For example, the shapes of the sealant units 240 may also be polygonal, as shown in FIG. 4. Specially, the shapes of the sealant units 240 stacked to each other may fit to each other. Thus, the stacked sealant units 240 may embed into each other, as shown in FIG. 5 and FIG. 6.

Furthermore, the sealant units 240 can be formed between the array substrate 21 and the transparent substrate 23 by the same process. Alternately, the sealant units 240 also can be fabricated independently and then be disposed respectively between the array substrate 21 and the transparent substrate 23. The process of fabricating the sealant units 240 is not limited hereto.

Figure 7:
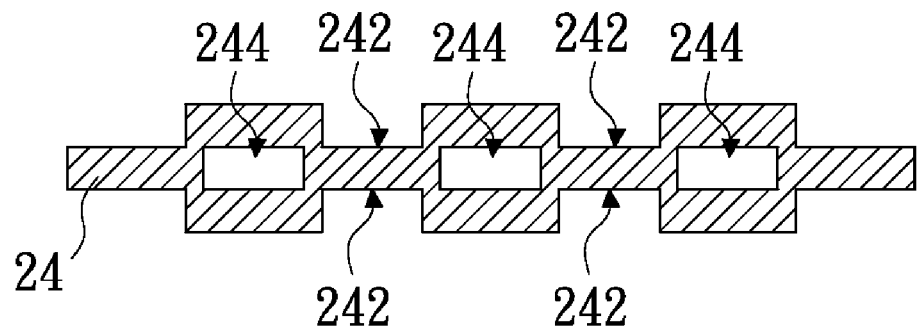
FIG. 7 is a schematic diagram illustrating a portion of the sealant of the flexible display device according to another embodiment of the invention.
Figure 8:
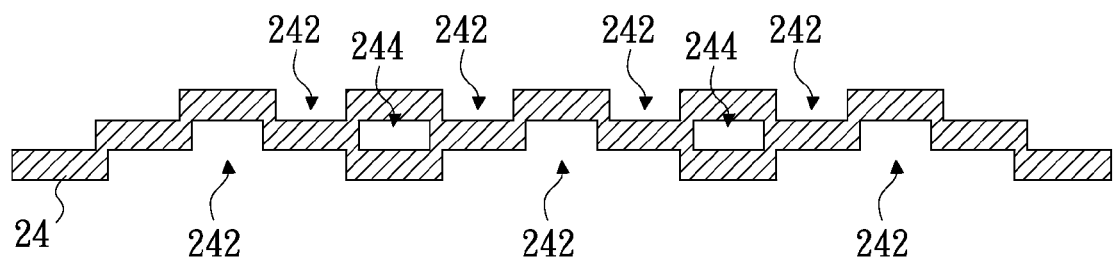
FIG. 8 is a schematic diagram illustrating a portion of the sealant of the flexible display device according to another embodiment of the invention.
Figure 9:
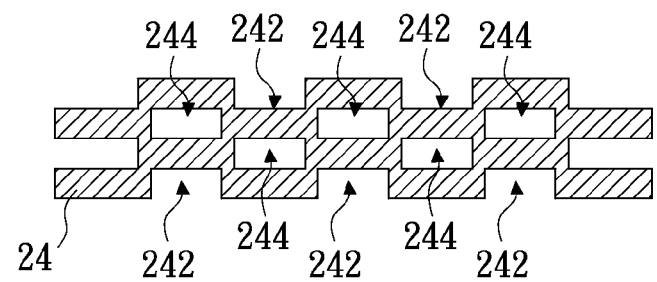
FIG. 9 is a schematic diagram illustrating a portion of the sealant of the flexible display device according to another embodiment of the invention.

Additionally, in another embodiment of the invention, the first sealant may further have at least an opening 244, as shown in FIG. 7 and FIG. 8. The opening 244 and the fillister 242 are interlaced to each other, so the external air or mist can not penetrate into the flexible display device 20 through the fillisters 242 and the opening 244. The amount of the openings 244 of the first sealant 24 is not limited hereto. In other embodiments, the openings 244 is interlaced and stacked fromward the display region 2012, as shown in FIG. 9.

Although in the aforementioned embodiments, the fillisters 242 and the openings 244 of the first sealant 24 all expose a portion of the array substrate 21, but those skilled in the art should know that even there are sealant disposed in the fillisters 242 or the openings 244 of the first sealant 24, it still can reduce the stress imposed on the first sealant 24 when the flexible display device is under bending as long as the sealant disposed in the fillisters 242 or the openings 244 is thinner than the first sealant 24. The following paragraph will take an embodiment for describing it.

Figure 10:
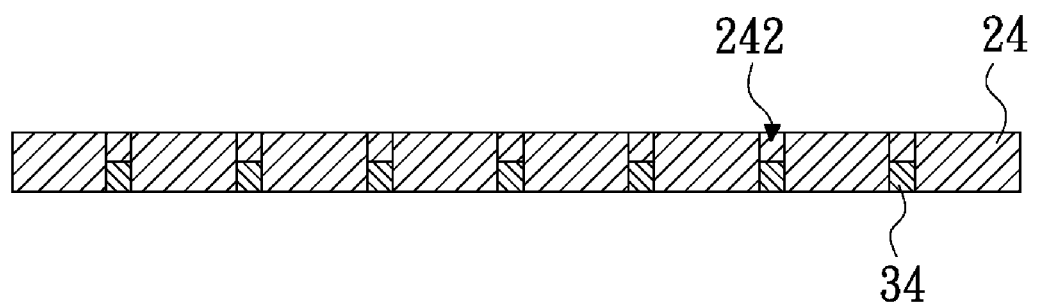
FIG. 10 is a schematic cross-sectional view of the sealant of the flexible display device according to another embodiment of the invention.

As shown in FIG. 10, the flexible display device 20 may further comprises a plurality of second sealants 34. Each second sealant 34 is respectively disposed in the fillisters 242 or the openings 244 of the first sealant, and the second sealants 34 are thinner than the first sealant 24. Moreover, the material of the second sealants 34 may be the same with or similar to the first sealant 24, such as at least one of silicone, polyurethane, acrylic resin and epoxy resin.

Referring to FIG. 2A again, the flexible display device 20 also comprises a driver IC 25 and a flexible printed circuit board 26 electrically connected to external circuits (not shown). The driver IC 25 and the flexible printed circuit board 26 both are disposed on the array substrate 21 and located in the sealant spread region. In detail, the driver IC 25 is electrically connected to the switch elements array 214 of the array substrate 21 for driving the switch elements (not shown). The flexible printed circuit board 26 is used for electrically connecting the driver IC 25 to external circuits. Thus, the driver IC 25 may receive the command outputted from the external circuits. In this embodiment, the first sealant 24 also covers the driver IC 25 and the flexible printed circuit board 26.

In summary, the sealant of the flexible display device of the invention has a plurality of fillisters or openings, so the stress imposed on the sealant as the flexible display device is under bending may be decreased. Then, the sealant may avoid breaking resulting from being bent for long time or several times. Therefore, the invention may prolong the use life of the sealant and enhance the packaging reliability of the flexible display device.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A flexible display device, comprising:
   an array substrate having a display region and a sealant coated region surrounding the display region;
   a display medium layer disposed on the array substrate and located in the display region;
   a transparent substrate disposed above the display medium layer; and
   a first sealant disposed between the array substrate and the transparent substrate and located in the sealant spread region and surrounding the display region, wherein the first sealant has a first sidewall and a second sidewall opposite to the first sidewall, the first sidewall is an outer sidewall of the first sealant, the second sidewall is an inner sidewall of the first sealant, each of the first sidewall and the second sidewall has a plurality of fillisters arranged at intervals, the fillisters defined on the first sidewall and the fillisters defined on the second sidewall are alternately arranged, the second sidewall faces the display medium layer, each fillister defined on the second sidewall has an opening facing the display medium layer, and an empty space is formed in each fillister to reduce bending stress.

2. The flexible display device as recited in claim 1, the array substrate comprising:
a substrate; and
a switch elements array disposed on the substrate.

3. The flexible display device as recited in claim 2, wherein the switch elements array is active elements array or passive elements array.

4. The flexible display device as recited in claim 3, wherein the switch elements array is a thin film transistors array.

5. The flexible display device as recited in claim 1, wherein the display medium layer is electro-phoretic layer, electro-wetting layer, liquid crystal layer or organic luminescence layer.

6. The flexible display device as recited in claim 1, wherein the transparent substrate is color filter substrate.

7. The flexible display device as recited in claim 1, wherein the first sealant comprises a plurality of sealant units interlaced and stacked with each other fromward the display region.

8. The flexible display device as recited in claim 7, wherein the stacked sealant units are embedded in each other.

9. The flexible display device as recited in claim 1, wherein the first sealant further has at least an opening exposing the array substrate and interlaced with the fillisters.

10. The flexible display device as recited in claim 9, further comprising a plurality of second sealants, each second sealant is located in one of the opening and the fillisters, the second sealants are thinner than the first sealant.

11. The flexible display device as recited in claim 1, wherein the first sealant further has a plurality of openings interlaced and stacked with each other fromward the display region.

12. The flexible display device as recited in claim 1, wherein the material of the transparent substrate comprises plastic.

13. The flexible display device as recited in claim 12, wherein the material of the transparent substrate comprises at least one of polyethylene terephthalate, polyethylene naphthalene, aromatic polyamide, polyimide, polycycloolefin, polysulfone, epoxy resin, polycarbonate and polymethyl methacrylate.

14. The flexible display device as recited in claim 1, wherein the material of the first sealant comprises ultraviolet photo-curing adhesive or heat-curing adhesive.

15. The flexible display device as recited in claim 14, wherein the material of the first sealant comprises at least one of silicone, polyurethane, acrylic resin and epoxy resin.

16. The flexible display device as recited in claim 1, wherein the first sealant comprises a plurality of sealant units, the sealant units are interlaced to each other and stacked to two layers fromward the display region, and surfaces of the two layers contacted with each other are flat.

* * * * *